(12) United States Patent
Milne et al.

(10) Patent No.: US 8,675,014 B1
(45) Date of Patent: Mar. 18, 2014

(54) EFFICIENTLY DETECTING GRAPHICS OBJECTS NEAR A SELECTED POINT

(75) Inventors: Roger B. Milne, Boulder, CO (US); Jeffrey C. Ward, Arvada, CO (US)

(73) Assignee: Disney Enterprises, Inc., Burbank, CA (US)

( * ) Notice: Subject to any disclaimer, the term of this patent is extended or adjusted under 35 U.S.C. 154(b) by 466 days.

(21) Appl. No.: 12/870,669

(22) Filed: Aug. 27, 2010

(51) Int. Cl.
  *G09G 5/00* (2006.01)
(52) U.S. Cl.
  USPC .......................................................... 345/629
(58) Field of Classification Search
  USPC .......................................................... 345/629
  See application file for complete search history.

(56) References Cited

U.S. PATENT DOCUMENTS

| | | | | |
|---|---|---|---|---|
| 4,698,625 A * | 10/1987 | McCaskill et al. | 345/157 |
| 5,315,313 A * | 5/1994 | Shinagawa | 345/159 |
| 5,396,590 A * | 3/1995 | Kreegar | 715/808 |
| 5,636,297 A * | 6/1997 | Eller et al. | 382/293 |
| 5,757,358 A * | 5/1998 | Osga | 715/862 |
| 5,850,206 A * | 12/1998 | Kashiwagi | 345/418 |
| 5,990,862 A * | 11/1999 | Lewis | 715/858 |
| 6,018,333 A * | 1/2000 | Denber | 715/790 |
| 6,097,392 A * | 8/2000 | Leyerle | 715/863 |
| 6,259,436 B1 * | 7/2001 | Moon et al. | 345/173 |
| 6,567,070 B1 * | 5/2003 | Light et al. | 345/157 |
| 6,587,131 B1 * | 7/2003 | Nakai et al. | 715/857 |
| 6,693,653 B1 * | 2/2004 | Pauly | 715/857 |
| 7,552,458 B1 * | 6/2009 | Finseth et al. | 725/34 |
| 7,689,936 B2 * | 3/2010 | Rosel | 715/852 |
| 7,911,481 B1 * | 3/2011 | Ballagh et al. | 345/629 |
| 2006/0197999 A1 * | 9/2006 | Murakami | 358/538 |
| 2006/0288314 A1 * | 12/2006 | Robertson | 715/863 |
| 2008/0133579 A1 * | 6/2008 | Lim | 707/102 |
| 2009/0249257 A1 * | 10/2009 | Bove et al. | 715/858 |

\* cited by examiner

*Primary Examiner* — David T Welch
*Assistant Examiner* — Jin Ge
(74) *Attorney, Agent, or Firm* — Patterson & Sheridan, LLP

(57) ABSTRACT

A computer-implemented method for efficiently detecting graphics objects near a selected point in an application is disclosed. The method implements a two-stage selection technique. In a first stage, a set of one or more graphics objects that are considered equally good candidates for selection is determined, and in a second stage one of the graphics objects from the set is ultimately selected based on certain other selection criteria. In the first stage, the application determines if a selected pixel overlaps with any graphics objects. If the selected pixel does not overlap with any graphics objects, then the application determines whether one of a set of cursor footprints overlap with any graphics objects. If multiple graphics objects overlap the selected pixel, or the minimum sized cursor footprint, then, in a second stage, one of the multiple graphics objects is selected based on certain other selection criteria.

20 Claims, 8 Drawing Sheets

__US 8,675,014 B1__

EFFICIENTLY DETECTING GRAPHICS OBJECTS NEAR A SELECTED POINT

BACKGROUND OF THE INVENTION

1. Field of the Invention

The invention relates generally to manipulating graphics objects in an application and, more specifically, to efficiently detecting graphics objects near a selected point in the application.

2. Description of the Related Art

Many applications are configured to allow a user to interact with on-screen graphics objects. For example, some applications allow users to draw graphics objects in a drawing and to manipulate existing objects with tools provided in the application. Many of the graphics objects in these applications have fine features, such as points or lines, which may be difficult to select or manipulate with a conventional input device like a computer mouse. Current techniques for selecting a feature of a graphics object involve positioning a cursor over the feature with the computer mouse and selecting the feature using one of the computer mouse's buttons.

One drawback to this approach is that some users with diminished motor skills, such as young children and people with disabilities, may have difficulty positioning the cursor at the precise location of such fine features. When users with diminished motor skills attempt to select a fine feature, such as a point or a line, by clicking the computer mouse button, the feature of the graphics object may not be selected if the cursor is not exactly over the feature. Thus, users that are unable to position the cursor exactly may be required to make repeated attempts to select the intended feature.

As the foregoing illustrates, what is needed in the art is an improved approach for detecting graphics objects near a selected point in an application.

SUMMARY OF THE INVENTION

One embodiment of the invention sets forth a computer-implemented method for selecting a graphics object within a digital canvas or document that includes a plurality of graphics objects. The method includes the steps of selecting a pixel within the digital canvas or document, and determining that the pixel does not overlap any of the graphics objects in the plurality of graphics objects or that the pixel overlaps a first graphics object and one or more other graphics objects in the plurality of graphics objects. If the pixel does not overlap any of the graphics objects in the plurality of graphics objects, then the method includes the steps of determining a minimum sized footprint around the pixel that overlaps at least a first graphics object in the plurality of graphics objects, and returning the first graphics object when either the minimum sized footprint overlaps only the first graphics object, or the minimum sized footprint overlaps the first graphics object and one or more other graphics objects in the plurality of graphics objects, and the first graphics object is identified as being the best graphics object to select. If the pixel overlaps a first graphics object and one or more other graphics objects in the plurality of graphics objects, and the first graphics object is identified as being the best graphics object to select, then the method includes the step of returning the first graphics object One advantage of the disclosed method is that it provides a footprint around a selected pixel to assist users who may be having trouble drawing, selecting or otherwise manipulating a graphics object in a digital canvas or document. The minimum sized footprint is found that overlaps one or more graphics objects in the digital canvas or document. In the case where the footprint overlaps multiple graphics objects, the "best" graphics object is automatically selected for the user. With this approach, a larger range of users, including younger children, can interact more effectively with applications, such as computer-based drawing applications.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the invention. However, it will be apparent to one of skill in the art that the invention may be practiced without one or more of these specific details. In other instances, well-known features have not been described in order to avoid obscuring the invention.

System Overview

Figure 1:
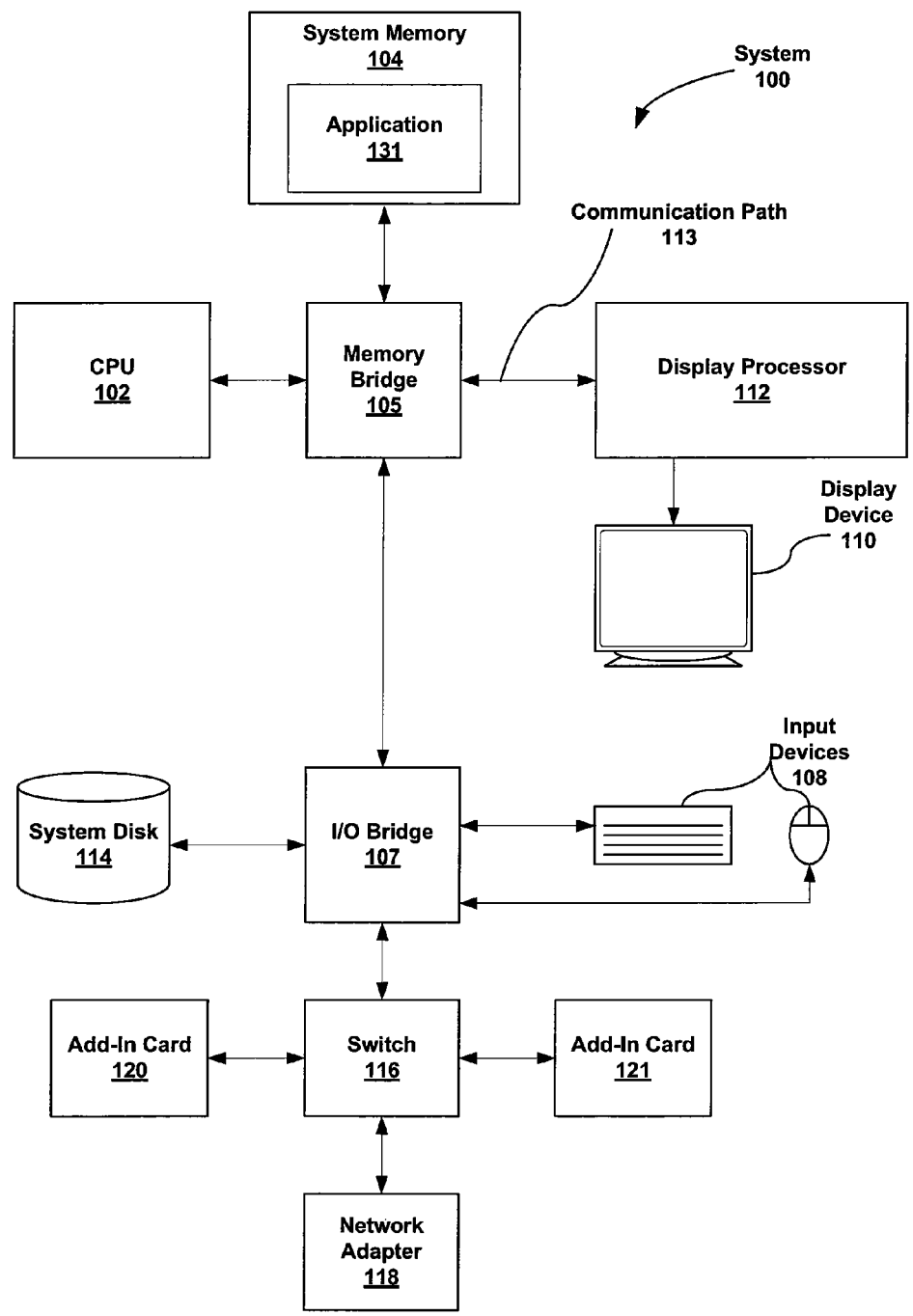
FIG. 1 is a block diagram of a system configured to implement one or more aspects of the invention.

FIG. 1 is a block diagram of a system 100 configured to implement one or more aspects of the present invention. System 100 may be a computer workstation, personal computer, video game console, personal digital assistant, rendering engine, mobile phone, hand held device, smart phone, super-smart phone, or any other device suitable for practicing one or more embodiments of the present invention.

As shown, system 100 includes one or more processing units, such as central processing unit (CPU) 102, and a system memory 104 communicating via a bus path that may include a memory bridge 105. CPU 102 includes one or more processing cores, and, in operation, CPU 102 is the master processor of system 100, controlling and coordinating operations of other system components. System memory 104 stores software applications and data for use by CPU 102. CPU 102 runs software applications and optionally an operating system. Memory bridge 105, which may be, e.g., a Northbridge chip, is connected via a bus or other communication path (e.g., a HyperTransport link) to an I/O (input/output) bridge 107. I/O bridge 107, which may be, e.g., a Southbridge chip, receives user input from one or more user input devices 108 (e.g., keyboard, mouse, digital pen, joystick, digitizer tablets, touch pads, touch screens, still or video cameras, motion sensors, and/or microphones) and forwards the input to CPU 102 via memory bridge 105.

One or more display processors, such as display processor 112, are coupled to memory bridge 105 via a bus or other communication path (e.g., a PCI Express, Accelerated Graphics Port, or HyperTransport link); in one embodiment display processor 112 is a graphics subsystem that includes at least one graphics processing unit (GPU) and graphics memory. Graphics memory includes a display memory (e.g., a frame buffer) used for storing pixel data for each pixel of an output image. Graphics memory can be integrated in the same device as the GPU, connected as a separate device with the GPU, and/or implemented within system memory 104.

Display processor 112 periodically delivers pixels to a display device 110 (e.g., a screen or conventional CRT, plasma, OLED, SED or LCD based monitor or television). Additionally, display processor 112 may output pixels to film recorders adapted to reproduce computer generated images on photographic film. Display processor 112 can provide display device 110 with an analog or digital signal.

A system disk 114 is also connected to I/O bridge 107 and may be configured to store content and applications and data for use by CPU 102 and display processor 112. System disk 114 provides non-volatile storage for applications and data and may include fixed or removable hard disk drives, flash memory devices, and CD-ROM, DVD-ROM, Blu-ray, HD-DVD, or other magnetic, optical, or solid state storage devices.

A switch 116 provides connections between I/O bridge 107 and other components such as a network adapter 118 and various add-in cards 120 and 121. Network adapter 118 allows system 100 to communicate with other systems via an electronic communications network, and may include wired or wireless communication over local area networks and wide area networks such as the Internet.

Other components (not shown), including USB or other port connections, film recording devices, and the like, may also be connected to I/O bridge 107. For example, an audio processor may be used to generate analog or digital audio output from instructions and/or data provided by CPU 102, system memory 104, or system disk 114. Communication paths interconnecting the various components in FIG. 1 may be implemented using any suitable protocols, such as PCI (Peripheral Component Interconnect), PCI Express (PCI-E), AGP (Accelerated Graphics Port), HyperTransport, or any other bus or point-to-point communication protocol(s), and connections between different devices may use different protocols, as is known in the art.

In one embodiment, display processor 112 incorporates circuitry optimized for graphics and video processing, including, for example, video output circuitry, and constitutes a graphics processing unit (GPU). In another embodiment, display processor 112 incorporates circuitry optimized for general purpose processing. In yet another embodiment, display processor 112 may be integrated with one or more other system elements, such as the memory bridge 105, CPU 102, and I/O bridge 107 to form a system on chip (SoC). In still further embodiments, display processor 112 is omitted and software executed by CPU 102 performs the functions of display processor 112.

Pixel data can be provided to display processor 112 directly from CPU 102. In some embodiments of the present invention, instructions and/or data representing a scene are provided to a render farm or a set of server computers, each similar to system 100, via network adapter 118 or system disk 114. The render farm generates one or more rendered images of the scene using the provided instructions and/or data. These rendered images may be stored on computer-readable media in a digital format and optionally returned to system 100 for display. Similarly, stereo image pairs processed by display processor 112 may be output to other systems for display, stored in system disk 114, or stored on computer-readable media in a digital format.

Alternatively, CPU 102 provides display processor 112 with data and/or instructions defining the desired output images, from which display processor 112 generates the pixel data of one or more output images, including characterizing and/or adjusting the offset between stereo image pairs. The data and/or instructions defining the desired output images can be stored in system memory 104 or graphics memory within display processor 112. In an embodiment, display processor 112 includes 3D rendering capabilities for generating pixel data for output images from instructions and data defining the geometry, lighting shading, texturing, motion, and/or camera parameters for a scene. Display processor 112 can further include one or more programmable execution units capable of executing shader programs, tone mapping programs, and the like.

In one embodiment, application 131 is stored in system memory 104. Application 131 may be any application that when executed on CPU 102 allows users to select and manipulate graphical objects in a document or canvas, such as Adobe Photoshop or GIMP. In alternative embodiments, application 131 may be a Web application, such as a Flash program, that is stored on a remote server and accessed through network adapter 118.

It will be appreciated that the system shown herein is illustrative and that variations and modifications are possible. The connection topology, including the number and arrangement of bridges, may be modified as desired. For instance, in some embodiments, system memory 104 may be connected to CPU 102 directly rather than through a bridge, and other devices may communicate with system memory 104 via memory bridge 105 and CPU 102. In other alternative topologies display processor 112 may be connected to I/O bridge 107 or directly to CPU 102, rather than to memory bridge 105. In still other embodiments, I/O bridge 107 and memory bridge 105 may be integrated in a single chip. In addition, the particular components shown herein are optional. For instance, any number of add-in cards or peripheral devices might be supported. In some embodiments, switch 116 is eliminated, and network adapter 118 and add-in cards 120, 121 connect directly to I/O bridge 107.

Overview of Two-Stage Selection Technique

According to various embodiments of the invention, when a user attempts to select one of the graphics objects in a digital canvas, application 131 of FIG. 1 is configured to return the graphics object that the user most likely intended to select. To determine which graphics object to return, application 131 implements a two-stage selection technique. In the first stage, application 131 considers the proximity of the graphics objects in the digital canvas to a pixel selected by the user. In particular, application 131 evaluates whether the selected pixel or a footprint of minimal size around the selected pixel overlaps one or more of the graphics objects in the digital canvas. If the selected pixel or the footprint overlaps only one graphics object, then application 131 returns that graphics object as the one the user most likely intended to select. The second stage is implemented in cases where the selected pixel or the footprint of minimal size overlaps two or more graphics objects in the digital canvas. In the second stage, application 131 considers certain other selection criteria to determine which of the two or more graphics objects is the one the user most likely intended to select.

Figure 3A:
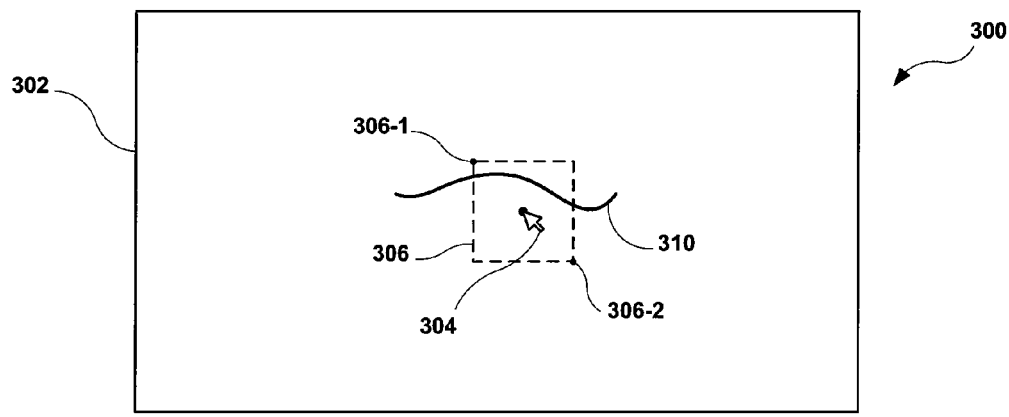
FIG. 3A illustrates a digital canvas in a graphics application environment, where a cursor footprint overlaps a graphics object, according to one embodiment of the invention.
Figure 3B:
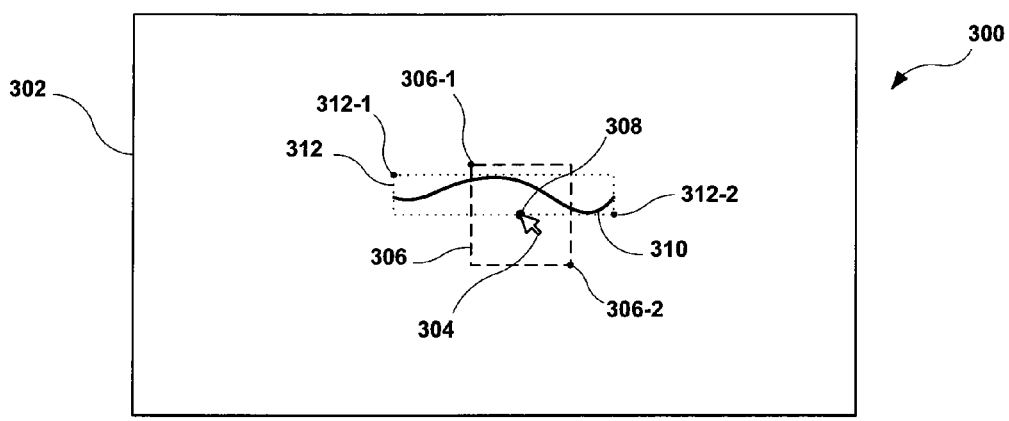
FIG. 3B illustrates the digital canvas of FIG. 3A where the cursor footprint overlaps a bounding box of graphics object, according to one embodiment of the invention.
Figure 4A:
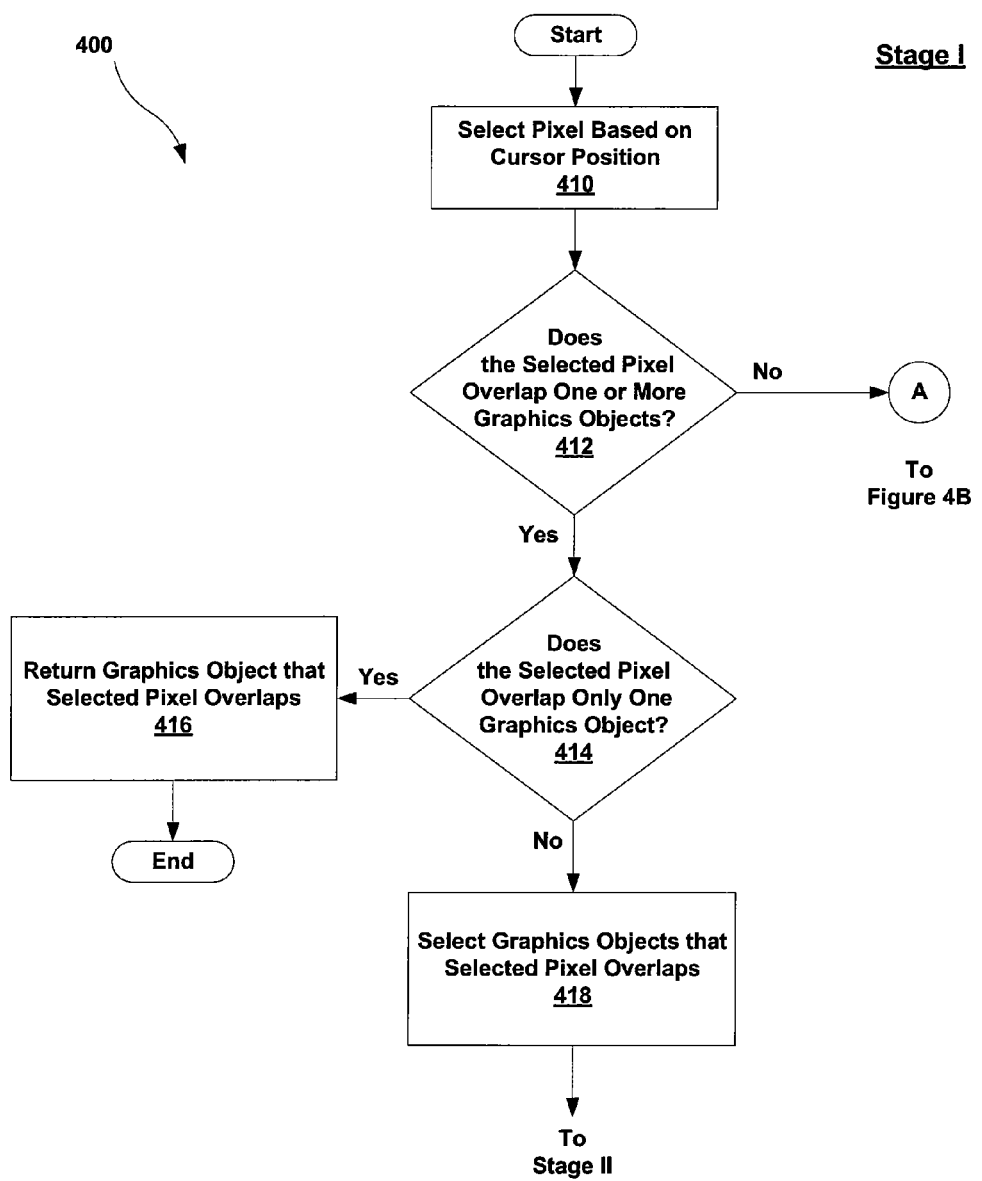
FIGS. 4A and 4B set forth a flow diagram of method steps for a first stage of a process for detecting graphics objects near a selected pixel, according to one embodiment of the invention.
Figure 4B:
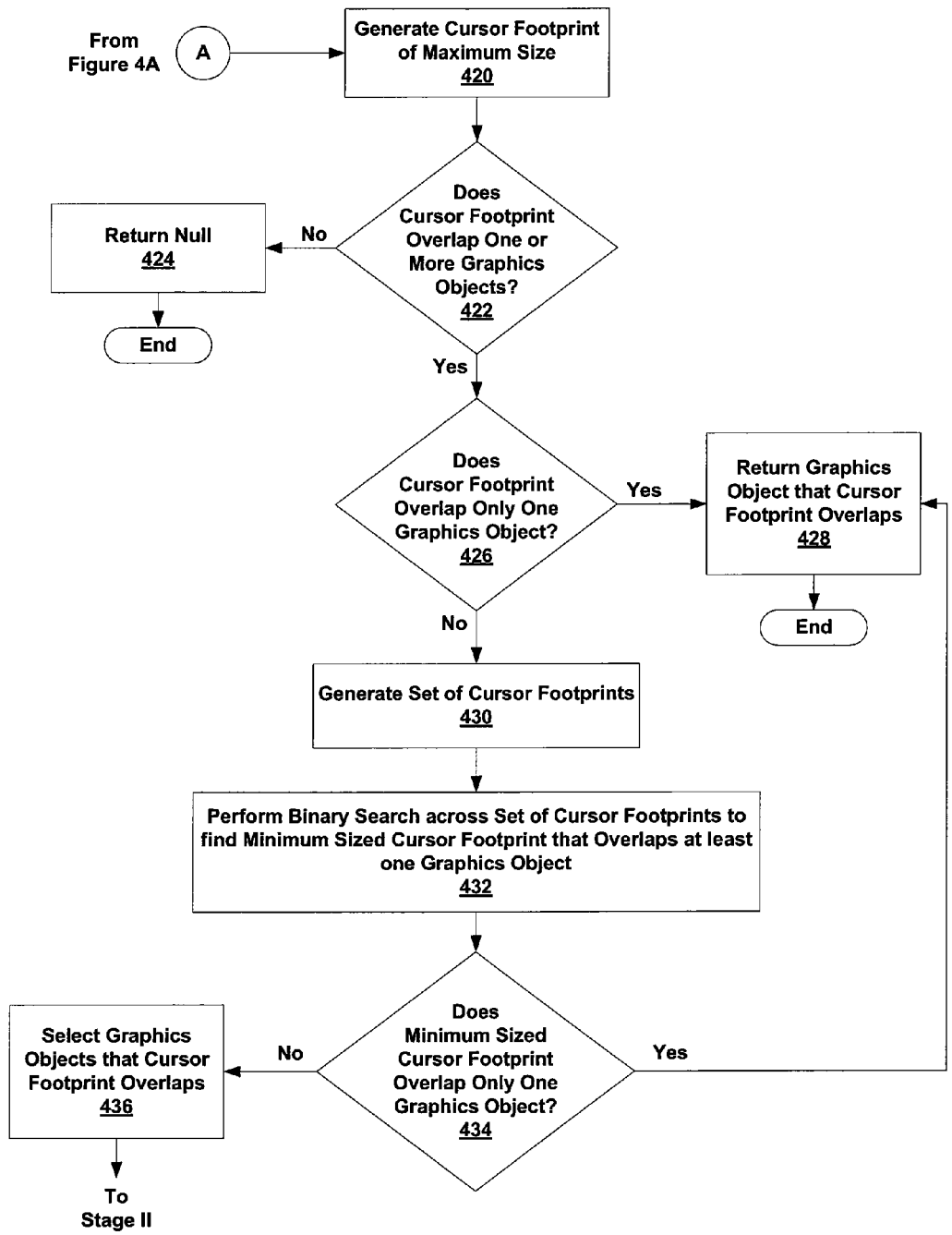

The two-stage selection technique implemented by application 131 is described in greater detail below in conjunction with FIGS. 2A-5. More particularly, FIGS. 2A-2E describe different aspects of the first stage of the two-stage selection technique. FIGS. 3A-3B describe different ways to determine whether the selected pixel or the footprint around the selected pixel overlaps a graphics object in the digital canvas. FIGS. 4A-4B describe a flow diagram of method steps implementing the first stage of the two-stage selection technique. Lastly, FIG. 5 describes a flow diagram of method steps implementing the second stage of the two-stage selection technique.

Figure 2A:
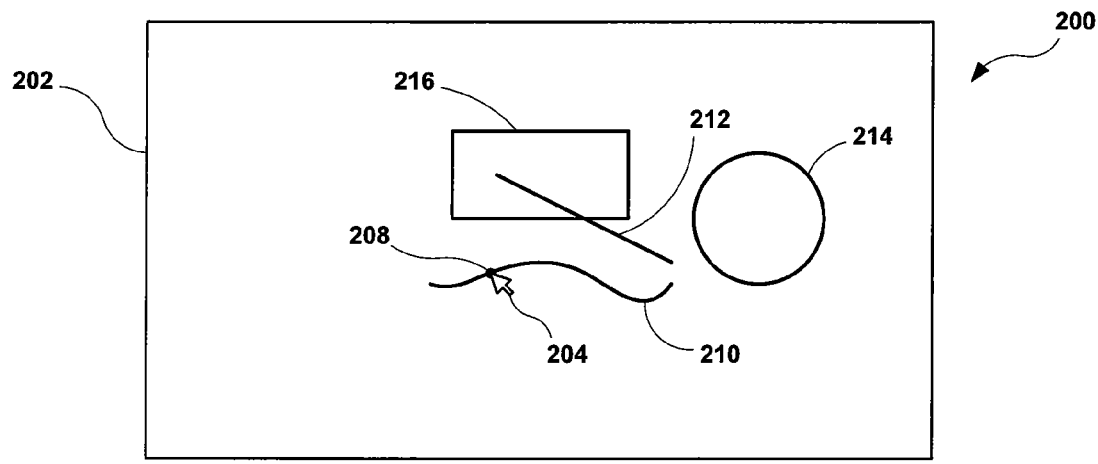
FIG. 2A illustrates a digital canvas of a graphics application environment, where a selected pixel overlaps a graphics object in a digital canvas, according to one embodiment of the invention.

FIG. 2A illustrates a digital canvas 202 of a graphics application environment 200, where a selected pixel 208 overlaps a graphics object 210 in a digital canvas 202, according to one embodiment of the invention. Application 131 of FIG. 1 may be a computer-based drawing application that generates the graphics application environment 200 that includes the digital canvas 202. Application 131 enables a user to draw or manipulate graphics objects in the digital canvas 202 using input devices 108. For example, a user may move a cursor 204 within the digital canvas 202 via a computer mouse device or digital pen device to draw, move or select a particular graphics object within the digital canvas 202.

As shown, a graphics object 210, a graphics object 212, a graphics object 214, and a graphics object 216 are included in the digital canvas 202. In one embodiment, when a user attempts to select one of these graphics objects via input device 108, the location of the cursor 204 in the digital canvas 202 defines a selected pixel 208. Application 131 then determines whether the selected pixel 208 overlaps any of the graphics objects in the digital canvas 202. In one embodiment, application 131 evaluates, on a pixel by pixel basis, any pixel location included within at least one of the graphics objects to determine whether the selected pixel 208 is the same pixel as any pixel included within at least one of the graphics objects. If the selected pixel 208 is the same pixel as any of the pixels within a particular graphics object, then application 131 concludes that the selected pixel overlaps the graphics object.

Referring to the example of FIG. 2A, because the selected pixel 208 overlaps only graphics object 210, application 131 returns graphics object 210 as the graphics object the user most likely intended to select. Thus, in this example, the first stage of the two-stage selection technique is implemented, but the second stage is not.

In alternative embodiments, application 131 may determine whether the selected pixel 208 overlaps any of the graphics objects in the digital canvas 202 by maintaining data tables that store lists of graphics objects according to all sections of the digital canvas that the graphics objects overlap. For example, using a lattice-grid tiling of digital canvas 202, application 131 may only evaluate on a pixel by pixel basis each graphics object that overlaps with the particular region of the digital canvas 202 that includes the selected pixel 208. It will be appreciated that other techniques for improving the efficiency and speed of determining whether the selected pixel 208 overlaps the graphics objects in the digital canvas 202 are within the scope of the invention.

Figure 2B:
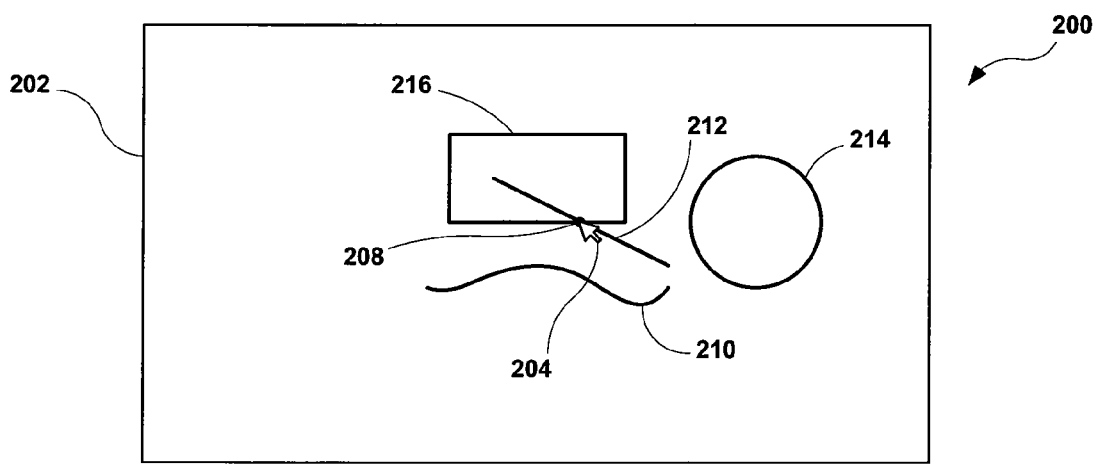
FIG. 2B illustrates the digital canvas, where the selected pixel overlaps two or more of the graphics objects in the digital canvas, according to one embodiment of the invention.

FIG. 2B illustrates the digital canvas 202, where the selected pixel 208 overlaps two or more of the graphics objects in the digital canvas 202, according to one embodiment of the invention. In contrast to FIG. 2A, sometimes the selected pixel 208 overlaps with multiple graphics objects in the digital canvas 202. In such cases, in the first stage of the two-stage selection technique, application 131 is configured first to define the set of graphics objects that the selected pixel 208 overlaps. Then, in the second stage of the two-stage selection technique, application 131 determines, based on certain other selection criteria, which graphics object in that set of graphics objects the user most likely intended to select.

Referring to the example of FIG. 2B, the selected pixel 208 overlaps both graphics object 212 and graphics object 216. Thus, application 131 defines a set of graphics objects that includes graphics object 212 and graphics object 216. Application 131 then evaluates the set of graphics objects based on certain other selection criteria to determine which of these two graphics objects the user most likely intended to select.

When implementing the second stage of the two-stage selection technique, application 131 may use various types of selection criteria to determine the graphics object the user most likely intended to select. In one embodiment, where digital canvas 202 comprises multiple drawing layers, application 131 determines which graphics object in the set of graphics objects the user most likely intended to select based on the depths of the layers associated with the different graphics objects in the set. For example, application 131 may be configured to select the graphics object in the set of graphics objects that resides at the top-most layer (i.e., the layer having the least depth) in the digital canvas 202. In alternative embodiments, application 131 may select the graphics object in the set of graphics objects based on the sum of pixels of each graphics object that the cursor footprint 206 overlaps. Application 131 may also factor pixel transparency into the pixel calculation, such as where each pixel contribution may be a value between zero and one when the graphics objects are rendered with transparency blending. In yet other embodiments, application 131 may select the graphics object in the set of graphics objects based on one or more other criteria, such as how closely the graphics objects in the set of graphics objects resemble a graphics object previously selected by the user. For example, application 131 may be configured to select a line over a circle if the user's previous two selections were lines.

Figure 2C:
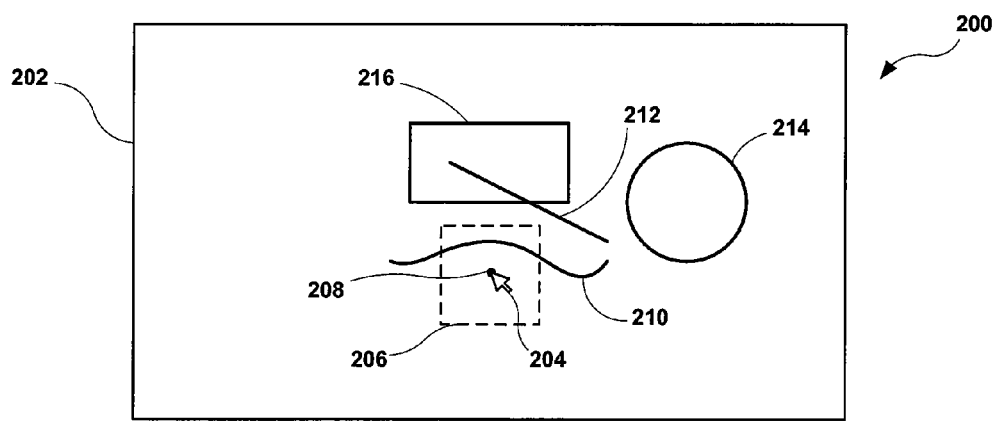
FIG. 2C illustrates the digital canvas, where a cursor footprint of maximum size overlaps one graphics object in the digital canvas, according to one embodiment of the invention.

FIG. 2C illustrates the digital canvas 202, where a cursor footprint 206 of maximum size overlaps one graphics object in the digital canvas 202, according to one embodiment of the invention. In contrast to FIGS. 2A and 2B, described above, the selected pixel 208 may not overlap any graphics objects in the digital canvas 202. In such cases, application 131 is configured to expand a cursor footprint 206 around the selected pixel 208 and then determine whether the cursor footprint 206 overlaps any graphics objects in the digital canvas 202. In one embodiment, the cursor footprint 206 is a square of maximum size M×M pixels that is centered on the selected pixel 208. In other embodiments, the cursor footprint 206 may be any technically feasible size. In still further embodiments, the cursor footprint 206 may be a shape other than a square, such as an ellipse, a circle, a line, or other shape. In addition, the shape may be positioned relative to the selected pixel 208 in ways other than being centered.

Referring to the example of FIG. 2C, the cursor footprint 206 of maximum size overlaps only graphics object 210 in the digital canvas 202. In such cases, application 131 is configured to return graphics object 210 as the graphics object the user most likely intended to select. In this example, as with the example of FIG. 2A, the first stage of the two-stage selection technique is implemented, but the second stage is not.

Figure 2D:
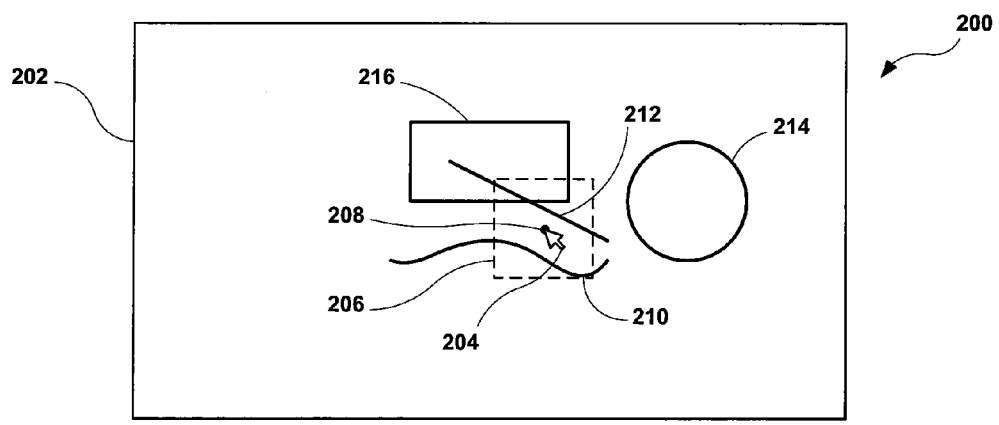
FIG. 2D illustrates the digital canvas, where the cursor footprint of maximum size overlaps two or more graphics objects in the digital canvas, according to one embodiment of the invention.
Figure 2E:
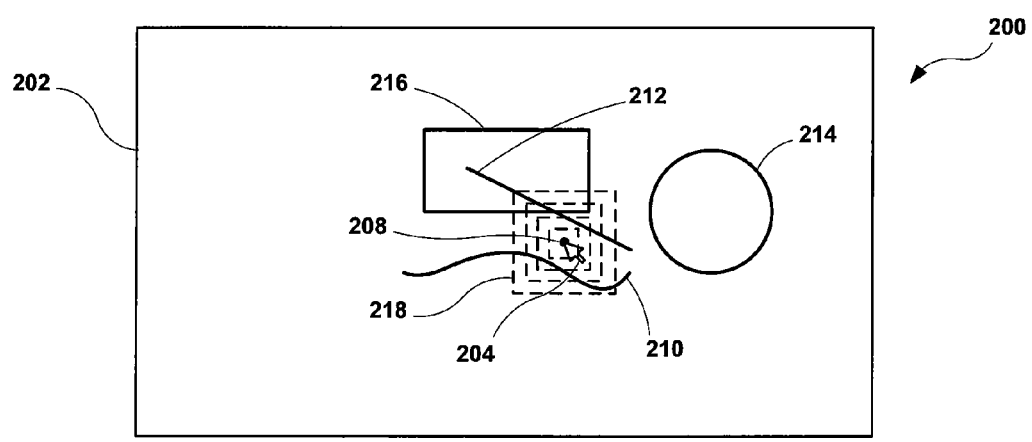
FIG. 2E illustrates a set of cursor footprints generated by application, according to one embodiment of the invention.

FIG. 2D illustrates the digital canvas 202, where the cursor footprint 206 of maximum size overlaps two or more graphics objects in the digital canvas 202, according to one embodiment of the invention. In contrast to FIG. 2C, the cursor footprint 206 overlaps multiple graphics objects in the digital canvas 202—graphics object 210, graphics object 212, and graphics object 216. In such cases, application 131 is configured to generate a set of cursor footprints. Each cursor footprint in the set has a different size, with the smallest sized cursor footprint corresponding to a single pixel and the largest sized cursor footprint corresponding to the cursor footprint of maximum size. FIG. 2E illustrates a set of cursor footprints 218 generated by application 131, according to one embodiment of the invention. As shown, the smallest sized cursor footprint corresponds to a single pixel, selected pixel 208, and the largest sized cursor footprint corresponds to the cursor footprint 206 of maximum area shown in FIG. 2D.

After generating the set of cursor footprints 218, application 131 determines the minimum sized cursor footprint in the set that overlaps at least one graphics object in the digital canvas 202. In one embodiment, application 131 performs a binary search across the set of cursor footprints 218 to make this determination. In other embodiments, application 131 may implement any other technically feasible technique for determining the cursor footprint of minimum size that still overlaps at least one graphics object in the digital canvas 202.

Application 131 then determines the number of graphics objects the minimum sized cursor footprint overlaps. If the minimum sized cursor footprint overlaps only one graphics object in the digital canvas 202, then application 131 returns that graphics object as the graphics object the user most likely intended to select. In such a case, as with the example of FIG. 2A, the first stage of the two-stage selection technique is implemented, but the second stage is not.

If, however, the minimum sized cursor footprint overlaps two or more graphics objects in the digital canvas 202, then application 131 implements the second stage of the two-stage selection technique. As described above in conjunction with FIG. 2B, application 131 evaluates the two or more graphics objects based on certain other selection criteria to determine which graphics objects the user most likely intended to select.

Determining Whether a Cursor Footprint Overlaps a Graphics Object

As persons skilled in the art will appreciate, application 131 may be configured to determine whether a cursor footprint overlaps a particular graphics object in the digital canvas 202 using a variety of techniques, two of which are described below in conjunction with FIGS. 3A and 3B. Thus, persons skilled in the art will further appreciate that any technique used to determine the overlap between a cursor footprint and a particular graphics object falls within the scope of the invention.

FIG. 3A illustrates a digital canvas 302 in a graphics application environment 300, where a cursor footprint 306 overlaps a graphics object 310, according to one embodiment of the invention. As shown, a cursor 304 is associated with a cursor footprint 306 that has an upper-left pixel 306-1 and a lower-right pixel 306-2. In one embodiment, application 131 is configured to compare the position of each pixel of graphics object 310 to the position of upper-left pixel 306-1 and the position of lower-right pixel 306-2 of cursor footprint 306 to determine whether any pixel of the graphics object 310 resides within the cursor footprint 306. If so, then the cursor footprint 306 is deemed to overlap graphics object 310. In alternative embodiments, application 131 may determine whether cursor footprint 306 overlaps graphics object 310 using rendering techniques, such as rendering the graphics object 310 and the cursor footprint 306 in a frame at 50% transparency using separate colors and then searching the pixels of the rendered frame to determine whether any of the pixels include data from both graphics object 310 and the cursor footprint 306. If so, then the cursor footprint 306 is deemed to overlap graphics object 310.

FIG. 3B illustrates the digital canvas 302 of FIG. 3A where the cursor footprint 306 overlaps a bounding box 312 of graphics object 310, according to one embodiment of the invention. As shown, bounding box 312 has an upper-left pixel 312-1 and a lower-right pixel 312-2 and corresponds to the smallest rectangular geometry that completely encloses graphics object 310. In one embodiment, application 131 is configured to compare the positions of the upper-left pixel 306-1 and lower-right pixel 306-2 of the cursor footprint 306 to the upper-left pixel 312-1 and lower-right pixel 312-2 of the bounding box 312 to determine whether the cursor footprint 306 at least partially overlaps bounding box 312. If so, then the cursor footprint 306 is deemed to overlap graphics object 310. In alternative embodiments, application 131 may determine whether cursor footprint 306 overlaps graphics object 310 using rendering techniques, such as the technique described above in reference to FIG. 3A.

Algorithms for Two-Stage Selection Technique

FIGS. 4A and 4B set forth a flow diagram of method steps 400 for a first stage of a process for detecting graphics objects near a selected pixel 208, according to one embodiment of the invention. Although the method steps are described in conjunction with the systems of FIGS. 1, 2A-2F, and 3A-3B, persons skilled in the art will understand that any system configured to perform the method steps, in any order, is within the scope of the invention.

As shown, the method 400 begins at step 410, where application 131 selects a pixel in digital canvas 202 in response to a signal received from one of the input devices 108. In one embodiment, application 131 may define the selected pixel based on the location of the cursor 204 in the digital canvas 202. At step 412, application 131 determines whether the selected pixel 208 overlaps one or more graphics objects in the digital canvas 202. If the selected pixel 208 overlaps at least one graphics object in the digital canvas 202, then the method 400 proceeds to step 414.

At step 414, application 131 determines whether the selected pixel 208 overlaps only one graphics object in the digital canvas 202. If the selected pixel 208 overlaps only one graphics object in the digital canvas 202, then the method 400 proceeds to step 416, where application 131 returns the one graphics object that the selected pixel 208 overlaps as the graphics object the user most likely intended to select. If, however, in step 414, application 131 determines that the selected pixel 208 overlaps two or more graphics objects in the digital canvas 202, then the method 400 proceeds to step 418.

At step 418, application 131 defines a set of graphics objects in the digital canvas 202 that the selected pixel 208 overlaps to include the two or more graphics objects identified in step 414. Application 131 then proceeds to implement the second stage of the two-stage selection technique, as described below in conjunction with FIG. 5.

Referring back now to step 412, if application 131 determines that the selected pixel 208 does not overlap any of the graphics objects in the digital canvas 202, then the method 400 proceeds to step 420. At step 420, application 131 generates a cursor footprint 206 having a maximum size. In one embodiment, the cursor footprint 206 of maximum size is a square of M×M pixels centered about the selected pixel 208. In alternative embodiments, the cursor footprint 206 may be of any size and may have any shape. At step 422, application 131 determines whether the cursor footprint 206 of maximum size overlaps one or more graphics objects in the digital canvas 202. If the cursor footprint 206 of maximum size does not overlap any graphics objects in the digital canvas 202, then the method 400 proceeds to step 424 and returns a null set. If, however, the cursor footprint 206 of maximum size overlaps at least one graphics object in the digital canvas 202, then the method 400 proceeds to step 426.

At step 426, application 131 determines whether the cursor footprint 206 of maximum size overlaps only one graphics object in the digital canvas 202. If the cursor footprint 206 overlaps only one graphics object in the digital canvas 202, then the method 400 proceeds to step 428, where application 131 returns the one graphics object that the cursor footprint 206 of maximum size overlaps as the graphics object the user most likely intended to select. If, however, the cursor footprint 206 overlaps more than one graphics object, then the method 400 proceeds to step 430.

At step 430, application 131 generates a set of cursor footprints 218. Each cursor footprint in the set has a different size, with the smallest sized cursor footprint corresponding to the selected pixel 208 and the largest sized cursor footprint corresponding to the cursor footprint 206 of maximum size. At step 432, application 131 performs a binary search across the set of cursor footprints 218 to determine the cursor footprint of minimum size in the set of cursor footprints 218 that overlaps at least one graphics object in the digital canvas 202. In other embodiments, application 131 may implement any other technically feasible technique for determining the cursor footprint of minimum size that still overlays at least one graphics object in the digital canvas 202.

At step 434, application 131 determines whether the minimum sized cursor footprint overlaps only one graphics object in the digital canvas 202. If application 131 determines that the minimum sized cursor footprint overlaps only one graphics object, then application 131 returns to step 428, and returns the one graphics object that the minimum sized cursor footprint overlaps. If, however, application 131 determines that the minimum sized cursor footprint overlaps more than one graphics object, then application 131 proceeds to step 436. At step 436, application 131 defines the set of graphics objects in the digital canvas 202 that the minimum sized cursor overlaps and implements the second stage of the two-stage selection technique described below in conjunction with FIG. 5.

Figure 5:
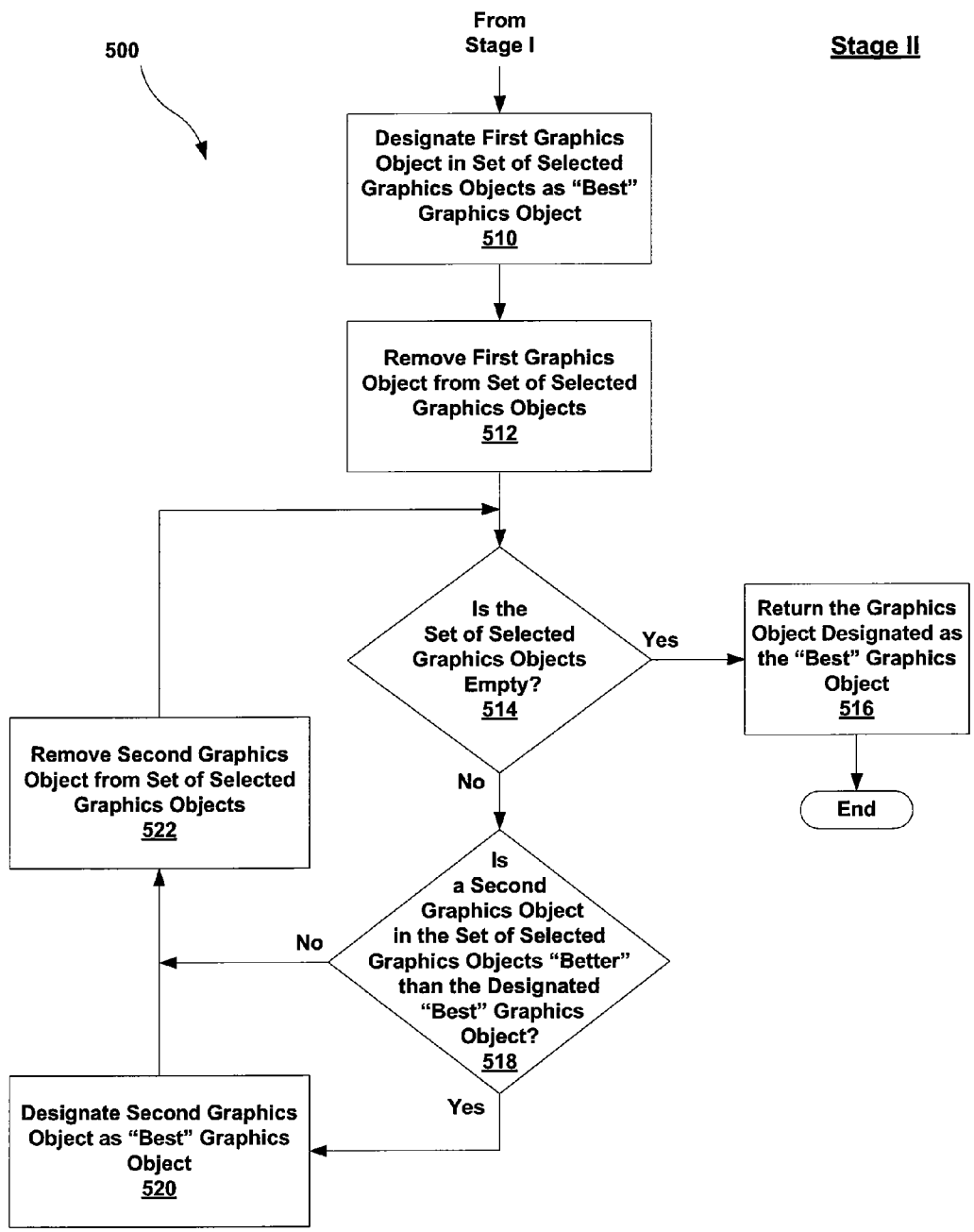
FIG. 5 is a flow diagram of method steps for a second stage of the two-stage selection technique for detecting graphics objects near a selected pixel, according to one embodiment of the invention.

FIG. 5 is a flow diagram of method steps 500 for a second stage of the two-stage selection technique for detecting graphics objects near a selected pixel 208, according to one embodiment of the invention. Although the method steps are described in conjunction with the systems of FIGS. 1, 2A-2F, and 3A-3B, persons skilled in the art will understand that any system configured to perform the method steps, in any order, is within the scope of the invention.

The method 500 begins at step 510, where application 131 designates a first graphics object in a set of graphics objects generated in the first stage of the two-stage selection technique as the "best" graphics object. At step 512, application 131 removes the first graphics object from the set of graphics objects. At step 514, application 131 determines whether the set of graphics objects is empty. If the set of graphics objects is empty, then the method 500 proceeds to step 516, where application 131 returns the first graphics object, which is designated as the "best" graphics object, as the graphics object the user most likely intended to select. The method 500 then terminates. If, however, the set of graphics objects is not empty, then the method 500 proceeds to step 518.

At step 518, application 131 determines whether a second graphics object in the set of graphics objects is "better" than the currently designated "best" graphics object based on certain other selection criteria. In one embodiment, application 131 determines whether the second graphics object is "better" based on the depths of the layers associated with the different graphics objects in the set of graphics objects. For example, if the second graphics object were included in a layer having a depth value that is less than the depth value of the layer that includes the currently designated "best" graphics object, and the "better" graphics object is considered to be the graphics object closer to the "top" of the digital canvas 202, then the second graphics object would be the "better" graphics object. In alternative embodiments, application 131 may determine whether the second graphics object is "better" than the currently designated "best" graphics object based other selection criteria, such as how closely the second graphics object and the currently designated "best" graphics object resemble one or more graphics object previously selected by the user.

If, at step 518, the second graphics object is deemed "better" than the currently designated "best" graphics object, then the method 500 proceeds to step 520, where application 131 designates the second graphics object as the "best" graphics object. At step 522, application 131 removes the second graphics object from the set of graphics objects, and the method returns to step 514, previously described here. If, however, at step 518, the second graphics object is not deemed "better" than the currently designated "best" graphics object, then the method 500 proceeds to step 522, previously described herein.

In sum, the disclosed systems and methods provide an effective and user-transparent mechanism for selecting a graphics object presented on a display screen based on the most probable intent of the user. As described, in a first stage a set of one or more graphics objects that are considered equally good candidates for selection is determined, and in a second stage one of the graphics objects from the set is ultimately selected based on certain other selection criteria.

More specifically, in the first stage of the two-stage selection technique, the application defines a selected pixel based on the cursor location. Then, the application determines whether the selected pixel overlaps one or more graphics objects. If the application determines that the selected pixel overlaps one graphics object, then the application returns the one graphics object the selected pixel overlaps. If the application determines that the selected pixel overlaps two or more graphics objects, then the application defines a set of graphics objects that the selected pixel overlaps to be processed by the second stage of the two-stage selection technique. If the application determines that the selected pixel does not overlap any graphics objects, then the application generates a cursor footprint of maximum size around the selected pixel.

If the application determines that the footprint of maximum size does not overlap any graphics objects, then the application returns a null set. If the application determines that the footprint of maximum size overlaps one graphics object, then the application returns the one graphics object that the footprint overlaps. If the application determines that the footprint of maximum size overlaps two or more graphics objects, then the application generates a set of footprints with the smallest sized footprint corresponding to the selected pixel and the largest sized footprint corresponding to the footprint of maximum size. Then, the application performs a binary search over the set of footprints to search for the minimum sized footprint that overlaps a non-empty set of graphics objects.

If the application determines that the minimum sized footprint overlaps one graphics object, then the application returns the graphics object the minimum sized footprint overlaps. If the application determines that the minimum sized footprint overlaps two or more graphics objects, then the application defines a set of graphics objects that the minimum sized footprint overlaps to be processed in the second stage. In the second stage of the two-stage selection technique, the set of graphics objects returned in the first stage is refined using certain other selection criteria to select the best candidate.

One advantage of the disclosed method is that it provides a footprint around a selected pixel to assist users who may be having trouble drawing, selecting or otherwise manipulating a graphics object in a digital canvas or document. The minimum sized footprint is found that overlaps one or more graphics objects in the digital canvas or document. In the case where the footprint overlaps multiple graphics objects, the "best" graphics object is automatically selected for the user. With this approach, a larger range of users, including younger children, can interact more effectively with applications, such as computer-based drawing applications.

While the foregoing is directed to embodiments of the present invention, other and further embodiments of the present invention may be devised without departing from the basic scope thereof. For example, aspects of the present invention may be implemented in hardware or software or in a combination of hardware and software. One embodiment of the present invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention.

In view of the foregoing, the scope of the present invention is determined by the claims that follow.

We claim:

1. A computer-implemented method for selecting a graphics object within a digital canvas or document that includes a plurality of graphics objects, the method comprising:

selecting a pixel within the digital canvas or document;

upon determining that the pixel does not overlap any of the graphics objects in the plurality of graphics objects:
determining a minimum sized footprint, of a plurality of footprints, around the pixel that overlaps at least a first graphics object in the plurality of graphics objects, and
returning the first graphics object:
when the minimum sized footprint overlaps only the first graphics object, or
when the minimum sized footprint overlaps the first graphics object and one or more other graphics objects in the plurality of graphics objects, and the first graphics object is identified as being the best graphics object to select; and upon determining that the pixel overlaps a first graphics object and one or more other graphics objects in the plurality of graphics objects, and the first graphics object is identified as being the best graphics object to select, then returning the first graphics object;

wherein the best graphics object to select is identified based on at least a pixel transparency of each of the plurality of graphics objects.

2. The method of claim 1, wherein determining the minimum sized footprint comprises generating the plurality of footprints, the method further comprising:
determining that the pixel does not overlap any of the graphics objects in the plurality of graphics objects or that the pixel overlaps a first graphics object and one or more other graphics objects in the plurality of graphics objects.

3. The method of claim 2, wherein the minimum sized footprint in the set of footprints corresponds to at least one pixel, and the largest sized footprint of the plurality of footprints corresponds to a maximum sized footprint.

4. The method of claim 2, wherein determining the minimum sized footprint further comprises performing a binary search across the plurality of footprints to identify the smallest footprint in the plurality of footprints that overlaps at least the first graphics object.

5. The method of claim 1, wherein the best graphics object to select is further based on a respective depth of each of the plurality of graphics objects, wherein identifying the first graphics object as the best graphics object to select comprises comparing the first graphics object with the one or more other graphics objects and determining that the first graphics object has a depth within the digital canvas or document that is less than any of the depths associated with the one or more other graphics objects.

6. The method of claim 1, wherein the best graphics object to select is further based on a selection history of the graphics objects, wherein identifying the first graphics object as the best graphics object to select comprises comparing the first graphics object and the one or more other graphics objects to a last selected object and determining that the first graphics object is most similar to the last selected object.

7. The method of claim 1, wherein determining that the minimum sized footprint overlaps at least the first graphics object comprises comparing the position of each pixel of the first graphics object to the position of at least one pixel of the minimum sized footprint.

8. The method of claim 1, wherein determining that the minimum sized footprint overlaps at least the first graphics object comprises comparing the positions of at least two pixels of a bounding box encompassing the first graphics object to the position of at least one pixel of the minimum sized footprint.

9. The method of claim 1, wherein a rendering technique is used to determine that the minimum sized footprint overlaps at least the first graphics object, wherein the best graphics object to select is further based on a respective sum of pixels of the graphics objects that the minimum sized footprint overlaps, wherein identifying the first graphics object as the best graphics object to select comprises determining that a sum of a number of pixels of the first graphics object is greater than the respective sum of each of the remaining graphics objects.

10. A non-transitory computer readable storage medium storing instructions that, when executed by a processor, cause the processor to select a graphics object within an digital canvas or document that includes a plurality of graphics objects, by performing the steps of:
selecting a pixel within the digital canvas or document;
upon determining that the pixel does not overlap any of the graphics objects in the plurality of graphics objects:
determining a minimum sized footprint, of a plurality of footprints, around the pixel that overlaps at least a first graphics object in the plurality of graphics objects, and
returning the first graphics object:
when the minimum sized footprint overlaps only the first graphics object, or
when the minimum sized footprint overlaps the first graphics object and one or more other graphics objects in the plurality of graphics objects, and the first graphics object is identified as being the best graphics object to select; and
upon determining that the pixel overlaps a first graphics object and one or more other graphics objects in the plurality of graphics objects, and the first graphics object is identified as being the best graphics object to select, then returning the first graphics object;
wherein the best graphics object to select is identified based on at least a pixel transparency of each of the plurality of graphics objects.

11. The non-transitory computer readable storage medium of claim 10, wherein determining the minimum sized footprint comprises generating the plurality of footprints, further comprising:
determining that the pixel does not overlap any of the graphics objects in the plurality of graphics objects or that the pixel overlaps a first graphics object and one or more other graphics objects in the plurality of graphics objects.

12. The non-transitory computer readable storage medium of claim 11, wherein the minimum sized footprint in the set of footprints corresponds to at least one pixel, and the largest sized footprint of the plurality of footprints corresponds to a maximum sized footprint.

13. The non-transitory computer readable storage medium of claim 10, wherein determining the minimum sized footprint further comprises performing a binary search across the plurality of footprints to identify the smallest footprint in the plurality of footprints that overlaps at least the first graphics object.

14. The non-transitory computer readable storage medium of claim 10, wherein the best graphics object to select is further based on a respective depth of each of the plurality of graphics objects, wherein identifying the first graphics object as the best graphics object to select comprises comparing the first graphics object with the one or more other graphics objects and determining that the first graphics object has a depth within the digital canvas or document that is less than any of the depths associated with the one or more other graphics objects.

15. The non-transitory computer readable storage medium of claim 10, wherein the best graphics object to select is further based on a selection history of the graphics objects, wherein identifying the first graphics object as the best graphics object to select comprises comparing the first graphics object and the one or more other graphics objects to a last selected object and determining that the first graphics object is most similar to the last selected object.

16. The non-transitory computer readable storage medium of claim 10, wherein determining that the minimum sized footprint overlaps at least the first graphics object comprises comparing the position of each pixel of the first graphics object to the position of at least one pixel of the minimum sized footprint.

17. The non-transitory computer readable storage medium of claim 10, wherein determining that the minimum sized footprint overlaps at least the first graphics object comprises comparing the positions of at least two pixels of a bounding box encompassing the first graphics object to the position of at least one pixel of the minimum sized footprint.

18. The non-transitory computer readable storage medium of claim 17, wherein a rendering technique is used to determine that the minimum sized footprint overlaps at least the first graphics object, wherein the best graphics object to select is further based on a respective sum of pixels of the graphics objects that the minimum sized footprint overlaps, wherein identifying the first graphics object as the best graphics object to select comprises determining that a sum of a number of pixels of the first graphics object is greater than the respective sum of each of the remaining graphics objects.

19. A computer system configured to select a graphics object within a digital canvas or document that includes a plurality of graphics objects, the computer system comprising:
a processor configured to:
upon determining that the pixel does not overlap any of the graphics objects in the plurality of graphics objects:
determine a minimum sized footprint, of a plurality of footprints, around the pixel that overlaps at least a first graphics object in the plurality of graphics objects, and
return the first graphics object:
when the minimum sized footprint overlaps only the first graphics object, or
when the minimum sized footprint overlaps the first graphics object and one or more other graphics objects in the plurality of graphics objects, and the first graphics object is identified as being the best graphics object to select; and
upon determining that the pixel overlaps a first graphics object and one or more other graphics objects in the plurality of graphics objects, and the first graphics object is identified as being the best graphics object to select, then return the first graphics object;
wherein the best graphics object to select is identified based on at least a pixel transparency of each of the plurality of graphics objects.

20. The computer system of claim 19, further comprising a memory storing instructions that, when executed by the processor, cause the processor to:
select the pixel;

determine that the pixel does not overlap any of the graphics objects or overlaps a first graphics object and one or more other graphics objects; and if the pixel does not overlap any of the graphics objects, then:
  determine the minimum sized footprint around the pixel, and return the first graphics object:
    when the minimum sized footprint overlaps only the first graphics object, or
    when the minimum sized footprint overlaps the first graphics object and one or more other graphics objects, and the first graphics object is identified as being the best graphics object to select; and if the pixel overlaps a first graphics object and one or more other graphics objects, and the first graphics object is identified as being the best graphics object to select, then return the first graphics object.

\* \* \* \* \*